United States Patent [19]

Tanabe

[11] Patent Number: 5,215,661
[45] Date of Patent: Jun. 1, 1993

[54] MULTI-LAYER FILTER CARTRIDGE
[75] Inventor: Kazushige Tanabe, Tokyo, Japan
[73] Assignee: Nippon Roki Co., Ltd., Tokyo, Japan
[21] Appl. No.: 757,145
[22] Filed: Sep. 10, 1991
[30] Foreign Application Priority Data
  Jun. 7, 1991 [JP] Japan .................. 3-51171
[51] Int. Cl.⁵ ............................. B01D 27/06
[52] U.S. Cl. ................. 210/494.1; 210/497.01;
  55/500; 55/502; 55/520
[58] Field of Search ......... 55/500, 502; 210/493.4,
  210/494.1, 497.1, 497.01, 497.2

[56] References Cited
U.S. PATENT DOCUMENTS

| | | | |
|---|---|---|---|
| 3,065,856 | 11/1962 | Goldman | 210/494.1 |
| 3,504,803 | 4/1970 | Brayman | 210/494.1 |
| 4,048,075 | 9/1977 | Colvin et al. | 210/494.1 |
| 4,058,464 | 11/1977 | Rogers | 210/494.1 |
| 4,187,136 | 2/1980 | Nastrand | 210/494.1 |
| 4,660,779 | 4/1987 | Nenesi | 210/494.1 |

Primary Examiner—Robert A. Dawson
Assistant Examiner—W. L. Millard
Attorney, Agent, or Firm—Armstrong, Westerman, Hattori, McLeland & Naughton

[57] ABSTRACT

The object of the present invention is to offer a general-purpose size filter cartridge for liquid filtration, which can extensively increase the service life for filtration. A depth type filter cartridge comprises a cylindrical hard porous core with threads wound thereupon, and it is characterized in that a sheet-like filter element is wound on said porous core directly or through a thread-winding layer, and a sheet-like filter element with a large number of pores is wound on said sheet-like filter element through a spacer.

8 Claims, 3 Drawing Sheets

MULTI-LAYER FILTER CARTRIDGE

BACKGROUND OF THE INVENTION

The present invention relates to a general-purpose size filter cartridge for liquid filtration, which extensively increases service life for filtration.

The thread-winding depth type cartridge filter, comprising cylindrical hard porous core with threads wound on it, has been widely used in the past because this can be produced at relatively low cost with high accuracy to meet wide variety of needs in the industrial fields.

However, when variation occurs in filtration accuracy due to irregular winding of threads or when liquid with high viscosity is to be filtered, winding mesh may be widened by high penetrating pressure. To solve this problem, a cartridge filter using nonwoven glass fiber fabric between upper and lower thread-winding layers has been used as a filter indispensable for the paint and ink industries. In such filter, the lower thread-winding layer is primarily used for preventing the glassfiber from falling off, while the upper thread-winding layer serves as a pre-filter, and the filtration is substantially performed by nonwoven glassfiber fabrics.

Moreover, the conventional depth type cartridge filter as described above does not completely satisfy the requirements in practical application in terms of service life for filtration, and there are imminent demands on a cartridge filter with longer service life.

SUMMARY OF THE INVENTION

The object of the present invention is to provide a multi-layer filter cartridge, which extensively increases service life for filtration.

Another object of the present invention is to provide a multi-layer filter cartridge, which can eliminate the variations in filtration accuracy caused by irregular thread-winding or widening of thread-winding meshes.

To attain the above objects, the depth type filter cartridge according to the present invention comprises a cylindrical hard porous core with threads wound thereupon, and it is characterized in that a sheet-like filter element is wound on said porous core directly or through thread-winding layer and that a sheet-like filter element with a large number of pores is wound on said sheet-like filter element through spacer.

The above and other objects and advantages of the invention will become more apparent from the following description.

DETAILED DESCRIPTION OF THE PREFERRED EMBODIMENT

In the following, description is given on the embodiment of the present invention in connection with the drawings.

Figure 1:
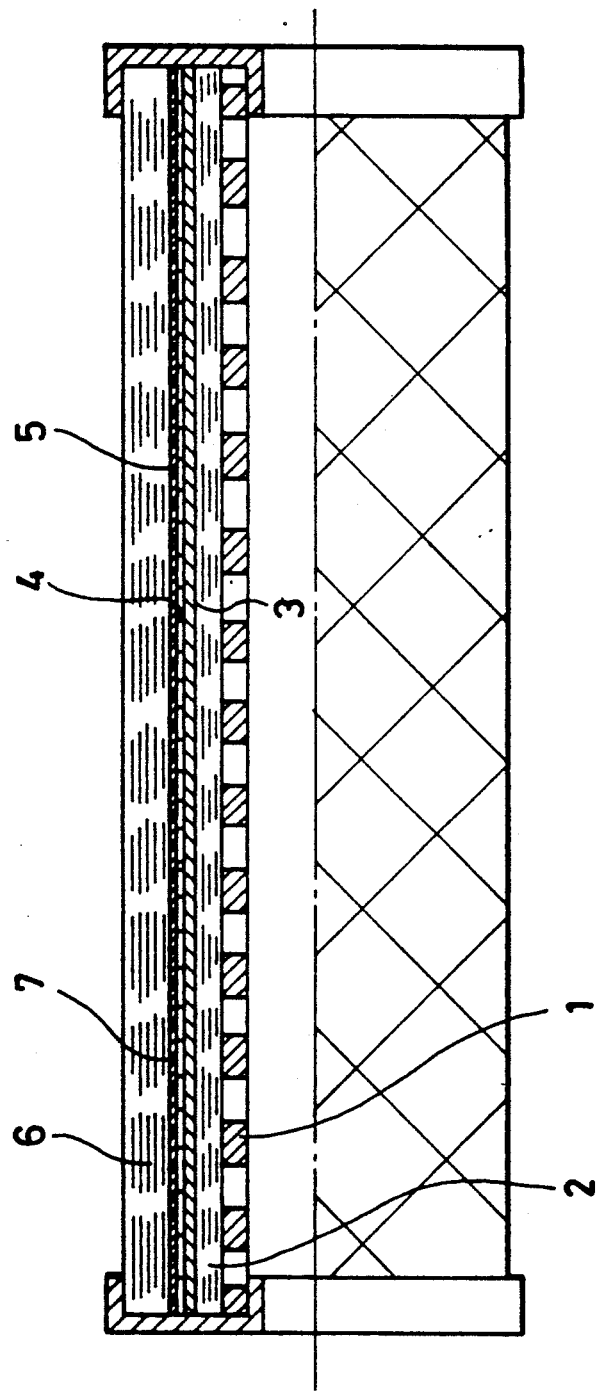
FIG. 1 is partial cross-sectional view of an embodiment of the present invention.

FIG. 1 is a partial cross-sectional view of an embodiment of the present invention. On a cylindrical hard porous core 1, a lower thread-winding layer 2 is wound. On outer periphery of said thread-winding layer 2, a nonwoven glassfiber fabric 3, a net-like element (spacer) 4 and a nonwoven glass fiber fabric 5 with a large number of pores 7 are wound one after another, and an upper thread-winding layer 6 is provided on the outermost layer.

In the above embodiment, nonwoven glassfiber fabric is used as the sheet-like filter elements 3 and 5, while this may be synthetic fiber sheet or filter paper.

As the spacer layer 4, coarse thread-winding layer with no filtrating property may be used in addition to the net-like element.

The thread-winding layer 2 is used to prevent the glassfiber from falling off. In the present invention, there is no need to use glassfiber for this, and the sheet-like filter element 3 may be directly wound on the porous core 1.

To prepare the filter cartridge of the present invention with the above arrangement, nonwoven glass-fiber fabric 3, net-like substance 4 and nonwoven glassfiber fabric 5 with a large number of pores may be wound on outer periphery of the thread-winding layer 2. In this case, nonwoven glassfiber fabric layer 3, net-like substance 4 and nonwoven glass-fiber fabric 5 with a large number of pores may be wound as an integral unit.

Figure 2:
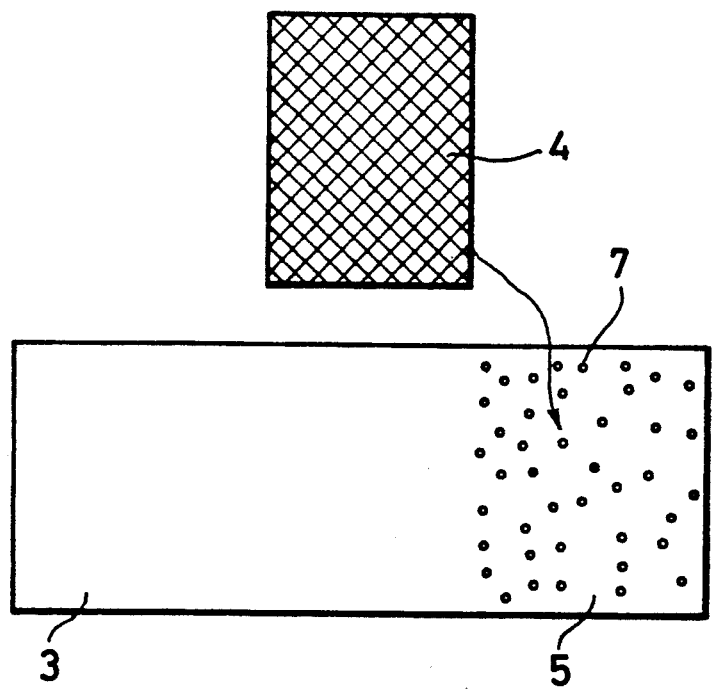
FIG. 2 is a top view of a sheet-like filter element and spacer wound on the filter cartridge of the present invention.

As shown in FIG. 2, long nonwoven glassfiber fabric with a large number of pores may be provided on one side, and a part of nonwoven glassfiber fabric 3 is wound on the lower thread-winding layer 2. Under this condition a net-like substance separately prepared is placed therebetween, and the net-like substance 4 and the nonwoven glassfiber fabric 5 with a large number of pores 7 may be simultaneously wound.

The size and the number of the pores on the sheet-like filter element 5 may be selected adequately according to the desired service life of filtration, and there is no restriction.

Next, description is given on the operating features of the present invention with the above arrangement.

When liquid is filtered using filter cartridge of the present invention as shown in FIG. 1, a part of insoluble substance in the liquid is filtered by the sheet-like filter element 5 with a large number of pores, while the remaining part of the insoluble substances reaches the spacer 4 through the pores 7 of the sheet-like filter element. The liquid is then dispersed over total periphery of the filter cartridge through the space provided by the spacer, and it is filtered by the sheet-like filter element 3. Accordingly, even when the outer sheet-like filter element 5 is clogged, the service life of the filter cartridge can be extended twice as long as before because liquid passes through a large number of pores 7 and the liquid containing less insoluble substances reaches the inner sheet-like filter element 3.

The changes over time of the differential pressure was measured using the filter cartridge of the present invention, and this was compared with that of the conventional type filter cartridge. The results of the test are described below.

Figure 3:
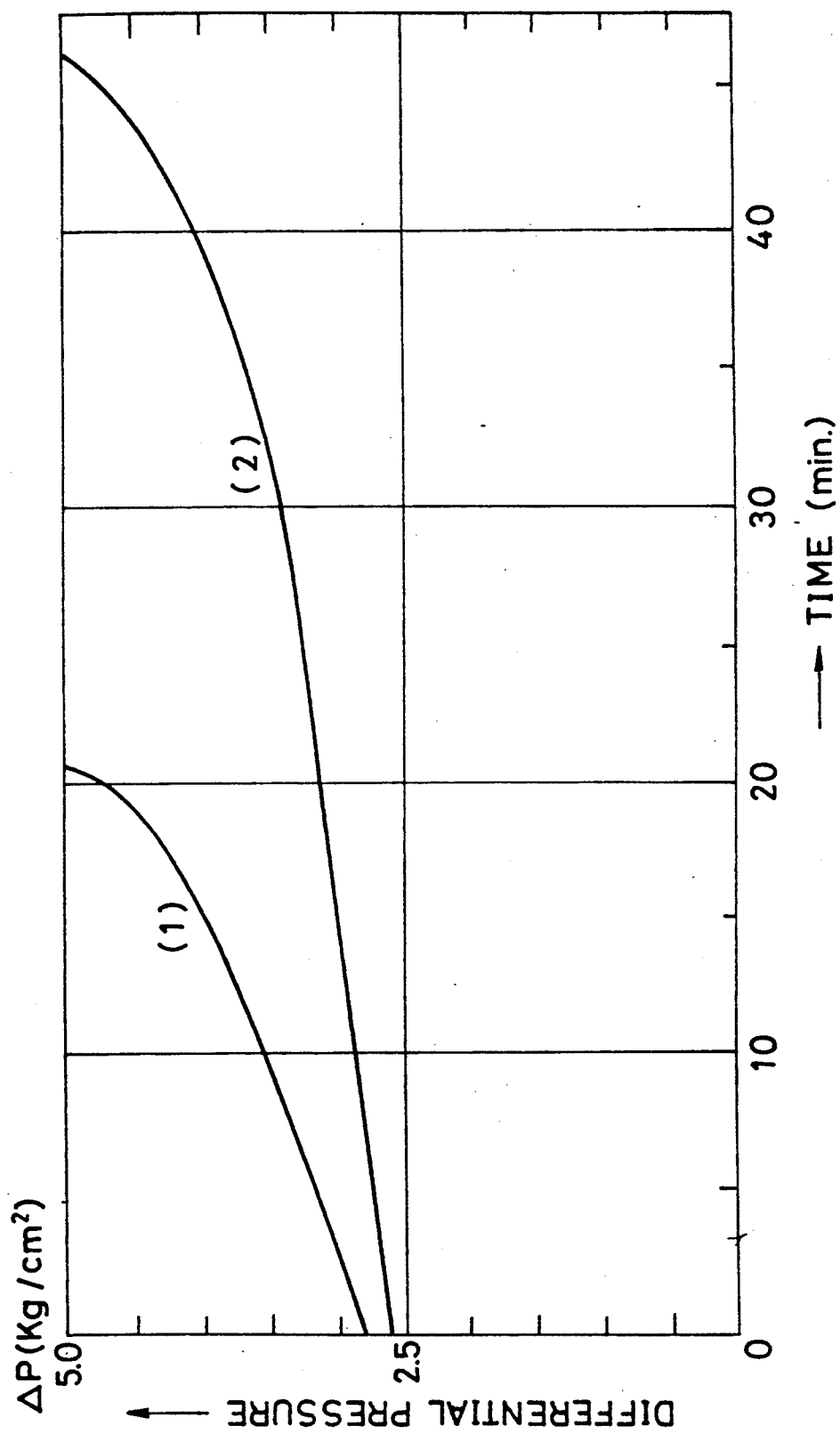
FIG. 3 is a graphic representation showing the relationship between differential pressure and the elapsed time for the filter cartridge of the present invention and that of the conventional type.

For the test, a test liquid with viscosity of 400 cps was used. JIS test dust No. 11 was placed into this liquid at the rate of 0.4 g/min., making it pass through the filter cartridge at flow rate of 5 liters/min, and the increase of pressure loss due to clogging was measured. The results are shown in FIG. 3. In the figure: (1) represents the changes over time of pressure loss when a conventional type filter cartridge was used, and (2) shows the case where filter cartridge of the present invention was used.

As it is evident from the figure, the time until the pressure loss reaches 5 kg/cm$^2$ with the filter cartridge of the present invention was twice as long as that of the case where a conventional type filter cartridge was used.

As described above, it is possible according to the present invention to extensively increase service life for filtration compared with the case of a conventional type filter cartridge because a sheet with a large number of pores is wound on outer pheriphery of sheet-like filter element through spacer and this prevents the inner sheet-like filter element from clogging.

What is claimed is:

1. A multi-layer filter cartridge comprising a cylindrical hard porous core with a thread winding layer wound thereabout, a first sheet-like filter element wound on said porous core, and a second sheet-like filter element with a large number of pores wound on said first sheet-like filter element with a spacer therebetween providing a space for dispersing liquid, said spacer being a net-like sheet or a coarse thread-winding layer without filtrating property.

2. A multi-layer filter cartridge according to claim 1, wherein the thread winding layer is over the second sheet-like filter element.

3. A multi-layer filter cartridge according to claim 2, further including a thread winding layer between the hard porous core and the first sheet-like filter element.

4. A multi-layer filter cartridge according to claim 1, wherein said sheet-like filter element is made of glass-fiber sheet, synthetic fiber sheet or filter paper.

5. A multi-layer filter cartridge according to claim 1, wherein the thread winding layer is between the hard porous core and the first sheet-like filter element.

6. A multi-layer filter cartridge comprising a cylindrical hard porous core, a first sheet-like filter element wound on said porous core, a first thread winding layer between the hard porous core and the first sheet-like filter element, a second sheet-like filter element with a large number of pores is wound on said first sheet-like filter element with a spacer therebetween providing a space for dispersing liquid, and a second thread winding layer wound over the second sheet-like filter element.

7. A multi-layer filter cartridge according to claim 6, wherein said sheet-like filter element is made of glass-fiber sheet, synthetic fiber sheet or filter paper.

8. A multi-layer filter cartridge according to claim 6, wherein said spacer is a net-like sheet or a coarse thread-winding layer without filtrating property.

* * * * *